United States Patent Office 3,226,410
Patented Dec. 28, 1965

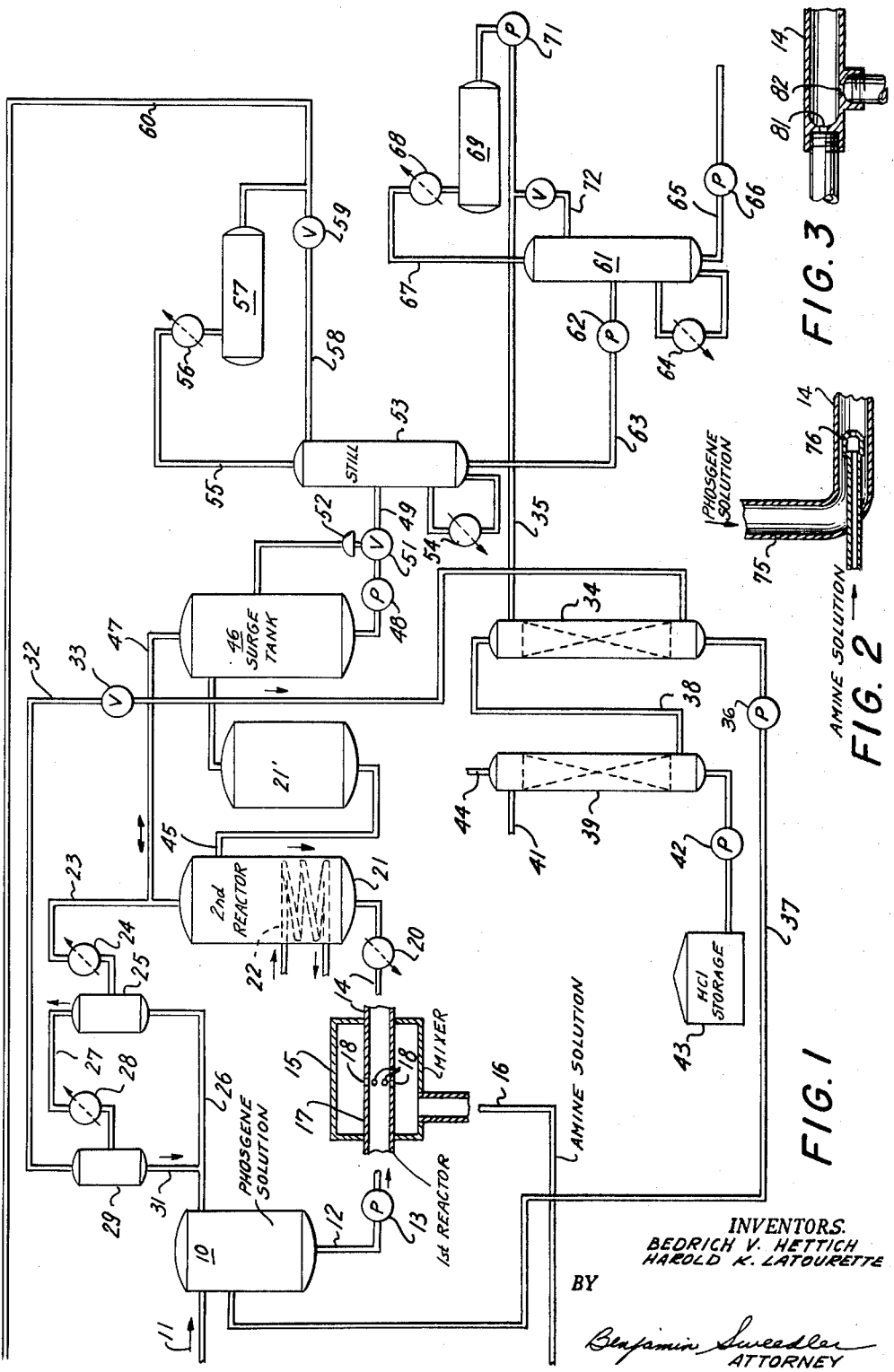

3,226,410
CONTINUOUS METHOD OF PREPARING AROMATIC ISOCYANATES
Bedrich V. Hettich, Darien, Conn., and Harold K. Latourette, Pennington, N.J., assignors to FMC Corporation, New York, N.Y., a corporation of Delaware
Filed July 20, 1962, Ser. No. 211,362
6 Claims. (Cl. 260—453)

This invention relates to the preparation of aromatic isocyanates and more particularly to a continuous process for preparing aromatic isocyanates by the reaction of an aromatic amine or mixture of aromatic amines with phosgene.

The reaction of phosgene with aromatic amines to produce the corresponding isocyanates is disclosed, for example, in United States Patent 2,908,703 granted October 13, 1959. In carrying out this reaction, as is well known, the isocyanate product and intermediate carbamyl chloride formed in the reaction may react with the amine to produce substituted ureas and polyureas which decrease the yield of the desired isocyanate product. To minimize the formation of such and other by-products during the reaction, and to speed up the reaction, as compared with the rates of reaction in known two-stage procedures involving a first stage carried out at a temperature of from 0° to room temperature (about 25° C.) and a second stage in which the intermediate reaction products produced in the first stage are reacted at temperatures of from 160° to 210° C., said Patent 2,908,703 discloses a continuous two-stage process in which in the first stage the phosgene and amine are reacted in the presence of an inert organic solvent at a temperature within the range of from 60° to 90° C. and the intermediate reaction product thus produced is reacted with phosgene at a higher temperature.

It is a principal object of the present invention to provide a continuous process of producing aromatic isocyanates by the reaction of phosgene with amines in the presence of an inert organic solvent, which continuous process results in a further marked reduction in the formation of by-products and an increase in the yield of the desired isocyanate.

Another object of this invention is to provide such process which can be carried out in equipment of simple design, which equipment lends itself to automatic control of the flow of reactants into and through the reactors, and to the continuous discharge of the reaction product therefrom.

In accordance with this invention, a continuous method of preparing aromatic isocyanates is provided, accomplishing these objects and having other advantages which will be apparent from the following detailed description of the invention, which continuous method involves:

(1) The continuous flow of a stream of phosgene through a tubular reactor under superatmospheric pressure;

(2) The continuous introduction into this stream of phosgene solution of a dilute stream of aromatic amine solution under superatmospheric pressure equal to or greater than that in the tubular reactor, to disperse the amine solution upon introduction into the tubular reactor through the flowing stream of phosgene solution;

(3) Regulating the amounts of the respective solutions so that phosgene in amount of at least 1 mol, preferably 6 to 12 mols, per mol of amine is introduced into admixture with the amine;

(4) Regulating the flow through the tubular reactor so that it has a Reynolds number of at least about 2,100, desirably from 5,000 to 2,000,000 or more;

(5) Maintaining the temperature at the point where the reactants are mixed within the range of from above 60° to about 90° C., preferably from 80° to 85° C., by introducing the reactants preheated to the reaction temperature within said temperature range;

(6) Continuously introducing the reaction mixture from the tubular reactor into a second reactor, preferably a tank or column reactor, maintained at a temperature of from 110° to 135° C., preferably 110° to 120° C.; the reaction mixture from the tubular reactor can be preheated to a temperature of from 110° to 135° C., preferably 110° to 120° C., before introduction into the second reactor or the entire heat input into the reaction mixture leaving the tubular reactor can take place in the second reactor;

(7) Continuously removing from the second reactor a liquid stream of reaction mixture consisting of organic solvent, the desired aromatic isocyanate reaction product, a relatively small quantity of by-products and hydrochloric acid and phosgene dissolved in the solvent, and a vapor stream consisting essentially of phosgene, solvent, hydrochloric acid and traces of the aromatic isocyanate.

The concentration of the amine in the amine solution fed to the reactor is from 2% to 25% by weight, preferably from about 5% to 10% by weight. The phosgene solution fed to the reactor may have a concentration of phosgene varying from 10% to 100% by weight, preferably from about 10% to 60% by weight phosgene and the rest solvent.

The phosgene solution desirably is introduced into the tubular reactor at any pressure necessary to meet the static and kinetic head pressures which are determined by the configuration of the equipment and the desired operating pressure within. The preferred range is 50 to 170 p.s.i.g.; lower and higher pressures than this range, however, may be used satisfactorily. The pressure of the amine solution should be greater than that of the phosgene solution where the two feed solutions mix in order to avoid back-flow of the phosgene solution into the feed port of the amine solution.

To insure that little or no back mixing in the tubular reactor takes place, the flow therethrough of the phosgene solution and the mixture formed by the injection of the amine solution into the phosgene solution should be "plug" flow obtained when the Reynolds number is at least 2100, and desirably within the range of 5000 to 2,000,000 or more.

The Reynolds number, as is well known, is determined by the equation $Re = DVE/u$ in which $D$ is the diameter of the tubular reactor in feet; $V$ is the velocity of the flow through the reactor in feet/second; $E$ is the density of the mixture flowing through the tubular reactor in pounds per cubic foot; and $u$ is the viscosity of the mixture flowing through the tubular reactor in pounds per foot per second.

The flow of the phosgene solution through the tubular reactor should be such that it sweeps the entire space of the tubular reactor clean at all times; i.e., minimize or preferentially eliminate to the maximum extent dead spaces in the tubular reactor. The latter is designed for uniform flow therethrough so that there are a minimum of dead spaces. By so designing the tubular reactor and regulating the flow therethrough so that it has a Reynolds number as hereinabove set forth, optimum mixing of the phosgene and amine takes place as reaction intermediates and isocyanate is formed with these products carried forward in the flowing stream. Hence back mixing is minimized and the isocyanate and/or carbamyl chloride formed does not move through the tubular reactor in a flow pattern, to any appreciable extent, where it can react with active hydrogen compounds, such as amine or amine hydrochlorides to form undesired by-products.

As the amine reactant aromatic primary, mono-, di- and polyamines, having no substituents other than primary amino which are capable of reacting with phosgene under the reaction conditions, can be used. Examples of such amines are aniline, the isomeric toluidines, the isomeric xylidines, o-, m-, and p-alkylanilines, o-, m-, and p-chloroanilines, the isomeric dichloroanilines, the isomeric phenylenediamines, the isomeric diaminotoluenes, the isomeric diaminoxylenes, diaminoalkyl benzenes, alpha- and beta-naphthylamines, the isomeric diaminonaphthalenes, the isomeric bisaminophenylmethanes, the isomeric tris-aminophenylmethanes, the dianisidines, the diaminodiphenyls and mixtures of these amines. The amine should be free of groups other than the amino group which are capable of reacting with phosgene or the isocyanate radical, i.e., that contain active hydrogen atoms. Such groups are, for example, —OH, —COOH, —SH, etc.

The solvents used are those which are inert to the reactants and reaction products. Preferred solvents are the chlorinated hydrocarbons including monochlorobenzene, o-dichlorobenzene, carbon tetrachloride, the corresponding chlorinated toluenes and xylenes, and trichloroethylene. Preferably, the solvent used has a lower boiling point than the isocyanate product to facilitate separation of the isocyanate product by distillation. Particularly preferred is monochlorobenzene.

In the accompanying drawing, showing for purposes of exemplification some of the preferred procedures of introducing the amine solution into the phosgene solution and a preferred layout of equipment for practicing the continuous process of this invention, without, however, limiting the invention to these procedures, FIGURE 1 is a flow sheet showing a preferred arrangement of equipment for practicing the process of this invention with the mixer through which the tubular reactor passes, shown on an enlarged scale as compared with the scale of the rest of the equipment;

FIGURE 2 is a vertical section showing an alternative arrangement for effecting the introduction of the amine-containing solution into the phosgene-containing solution; and FIGURE 3 is a vertical section showing still another alternative arrangement for effecting the introduction of the amine-containing solution into the phosgene-containing solution.

Referring to the drawing, 10 is a feed tank for the phosgene solution, provided with a feed line 11 at its top and a discharge line 12 leading from its base to a pump 13 which pumps the phosgene solution through a tubular reactor 14. In the embodiment of the invention shown in the drawing, the inlet end of the reactor is disposed in a cylindrical housing 15 which receives the amine solution from line 16 at a higher pressure than the pressure at which pump 13 pumps the phosgene solution through the reactor 14. The inlet end 17 of reactor 14 is provided with a plurality of spaced openings 18 through which the amine solution is jetted into the flowing stream of phosgene solution flowing past the openings 18.

The amine solution is pumped through the inlet pipe 16 at a pressure equal to and preferably greater than the pressure in reactor 14 to insure that none of the phosgene solution will enter into the amine solution entering through inlet pipe 16. The phosgene solution is pumped at relatively high velocities through reactor 14, past openings 18, so that the amine solution is moved rapidly away from these openings 18 by the sweep of the phosgene solution past the amine solution jetted into the phosgene solution through the openings 18. For example, openings or nozzles having an orifice yielding a flow equivalent to 180 to 260 gallons per minute per square inch are suitable to accomplish the nearly instantaneous and complete distribution of the amine solution under the flow conditions herein disclosed.

Reactor 14 is designed to minimize back-mixing. Bends, pockets or other configurations which would result in "dead spots" should also be minimized because unless the entire area of the reactor is swept clean continuously by the flowing stream of reaction mixture constituted chiefly of dilute phosgene solution, loss of yield and/or deposit of solids results. The flow of the reaction mixture should resemble a continuous "plug," filling the reactor 14, i.e., of the same diameter as the interior of the reactor, which type of flow is obtained at a minimum Reynolds number of 2,100, preferably within the range of from 5,000 to 2,000,000 or higher.

The reaction mixture can flow directly to tank or column reactor 21 or alternatively can flow through a preheater 20 which communicates with the base of the tank or column reactor 21 having a heating coil 22 therein. A vapor line 23 leads from the top of reactor 21 to a condenser 24 which communicates with a first tank 25 from which condensate (phosgene solution) flows through a line 26 to feed tank 10. Vapor from tank 25 flows through line 27 to a condenser 28 communicating with a second tank 29 from which condensate (phosgene solution) flows through a line 31 into line 26 leading into the feed tank 10. Reactor 21 can be operated under atmospheric or superatmospheric pressures of the order of 45 p.s.i.g. or higher.

Vapor from tank 29, comprising chiefly phosgene and HCl, flows through line 32 having a back pressure control valve 33 therein to maintain the reactors under the desired pressure conditions. Line 32 leads into the base of a phosgene absorber 34 supplied with solvent, through a line 35. Phosgene solution thus removed is pumped by pump 36 through line 37 into feed tank 10.

The unabsorbed gas, chiefly HCl, is passed through line 38 to an HCl absorber 39, supplied with water through a line 41. The HCl solution thus produced is pumped by pump 42 to an HCl storage tank 43 from which the HCl may be removed as desired as a saleable or otherwise useful by-product. Uncondensed vapors are vented from HCl absorber 39 through the vent line 44.

Reaction mixture is continuously withdrawn from reactor 21 through line 45 communicating with a tank 21′ which in turn communicates with a surge tank 46. Vapors released in surge tank 46 flow through vapor line 47 communicating with vapor line 23. Flow from surge tank 46 is effected by pump 48 in line 49 having a valve 51 equipped with a conventional regulator 52 responsive to the volume of liquid in surge tank 46; the valve 51 is automatically or manually adjusted to maintain the desired level of liquid in tank 46.

Line 49 leads into a still 53 provided with a reboiler 54. Reaction mixture is distilled in still 53 to drive off overhead unreacted phosgene, i.e., the excess phosgene, solvent and some HCl which flow through vapor line 55 into a condenser 56 from which the condensate flows into tank 57. From tank 57 a portion of the condensate is returned as reflux to still 53 through line 58 having a valve 59 therein for controlling flow therethrough. The remainder of the condensate is withdrawn through a line 60 treated to reduce or eliminate the HCl content thereof and the resultant condensate recycled for admixture with make-up phosgene and solvent to produce the phosgene solution supplied to feed tank 10 through line 11.

Bottoms comprising isocyanate reaction product and solvent are fed from still 53 to a second still 61 by a pump 62 in line 63. Still 61 effects the separation of isocyanate and solvent. It is provided with a reboiler 64 and a product draw-off line 65 communicating with a pump 66 which pumps the product to purification and storage. Vapor line 67 leads to a condenser 68 from which the condensate (solvent) is fed to a tank 69. From tank 69 a pump 71 supplies a portion of the condensate (solvent) through a valve controlled line 72, as reflux to still 61. The remainder of the condensate is pumped to the phosgene absorber 34 through line 35 or may be pumped directly to feed tank 10.

FIGURE 2 shows an alternative mixer arrangement. The phosgene solution is pumped into the reactor 14 through the angle connection 75 leading into the reactor 14. A nozzle 76 is disposed in the reactor as shown in FIGURE 2 so that the amine solution is jetted into the phosgene stream flowing through reactor 14. While FIGURE 2 shows only one such nozzle 76, any desired number can be used positioned so that the amine solution, at a greater pressure than the phosgene stream, is jetted into the phosgene stream with the nozzle 76 so positioned that the flowing stream of phosgene solution sweeps away the highly dispersed amine solution just as it enters the phosgene solution stream.

In FIGURE 3 the phosgene solution is pumped into the reactor 14 through the nozzle 81 and the amine solution is jetted into the phosgene stream flowing through reactor 14 through the jet 82.

The following examples are given to illustrate the invention without, however, limiting the invention to these illustrative embodiments. The examples are carried out in equipment of the type shown in FIGURE 1 of the drawing. In the examples, pounds are pounds per hour.

EXAMPLE I

During one hour of steady state operation, 302 pounds of phosgene solution consisting of 25% by weight of phosgene in monochlorobenzene are pumped continuously, at a pressure of 180 p.s.i.g., into reactor 14 maintained at a temperature of 82° C. During the same period, 310 pounds of an amine solution consisting of 15.5 pounds of 2,4-tolylene diamine and 294.5 pounds of monochlorobenzene are pumped, at a pressure of 190 p.s.i.g., into mixer 15. The mol ratio of phosgene to amine is 6 to 1.

The rate of flow of the reaction mixture through the reactor having an inside diameter of ⅜ inch and a length of 3 inches is 2.7 feet per second. The Reynolds number is 8630. The reaction mixture is preheated in heater 20 to a temperature of 120° C., at which temperature and at a pressure of about 20 p.s.i.g., it enters reactor 21 maintained at a temperature of 120° C. and a pressure of 10 p.s.i.g. 93.4 pounds of vapor are taken off overhead, consisting over the one-hour period of 43.4 pounds of phosgene, 31.8 pounds of solvent, and 18.2 pounds of HCl and traces of organic isocyanate. The HCl is separated from this mixture by flow through the equipment shown in the drawing and recovered as hydrochloric acid solution.

518.4 pounds of reaction mixture are removed per hour through line 45, consisting of 6.8 pounds of phosgene, 489.3 pounds of solvent, 0.3 pound of HCl, 21.1 pounds of tolylene diisocyanate and 0.9 pound of reaction by-products. The tolylene diisocyanate is separated by fractional distillation. The phosgene and solvent are returned to the process as shown in the drawing and hereinabove described.

The yield of tolylene diisocyanate is about 97% based on the amine.

EXAMPLE II 355.7 pounds per hour of a 30% phosgene solution in monochlorobenzene (1.079 mols) are pumped into reactor 14 at a pressure of 200 p.s.i.g. and a temperature of 85° C. Simultaneously, 286.0 pounds per hour of a 7.1% mixed-isomer (approximately 80% 2,4 isomer and 20% 2,6 isomer) tolylene diamine solution in monochlorobenzene (0.166 mol) are pumped into mixer 15 at a pressure of 215 p.s.i.g. and a temperature of 85° C. The mol ratio of phosgene to amine is 6.5 to 1.

The rate of flow of the reaction mixture through the reactor having an inside diameter of ⅜ inch and a length of 3 inches is 2.9 feet per second. The Reynolds number is 9280. The reaction mixture is preheated in heater 20 to a temperature of 120° C. at which temperature, and at a pressure of 20 p.s.i.g., it enters reactor 21 maintained at a temperature of 120° C. and a pressure of 10 p.s.i.g. 128.3 pounds per hour of vapor are taken off overhead, consisting of 63.3 pounds of phosgene, 23.8 pounds of hydrogen chloride, and 41.2 pounds of solvent. The HCl is separated from the vapors by flow through the equipment shown in the drawing and recovered as hydrochloric acid solution.

513.4 pounds per hour of reaction mixture are removed through line 45, consisting of:

| | Pounds |
|---|---|
| Phosgene | 10.6 |
| Hydrogen chloride | 0.4 |
| Solvent | 473.5 |
| Mixed-isomer tolylene diisocyanate | 27.7 |
| Reaction by-products | 1.2 |

The tolylene diisocyanate is separated by fractional distillation, whereas the phosgene and solvent are returned to the process as shown in the drawing and hereinabove described.

The yield of tolylene diamine is above 95%, based on the amount of 2,4 and 2,6 isomers fed to the reactor.

EXAMPLE III 10,680 pounds of a phosgene solution consisting of equal parts of phosgene and monochlorobenzene are pumped at a pressure of 150 p.s.i.g., into reactor 14 maintained at a temperature of 82° C., 11,200 pounds of an amine solution consisting of 1100 pounds of a mixed 2,4- and 2,6-tolylene diamine and 10,100 pounds of monochlorobenzene are pumped, at a pressure of 160 p.s.i.g., into mixer 15. The mol ratio of phosgene to amine is 6 to 1.

The rate of flow of the reaction mixture through the reactor having a nominal inside diameter of 1.5 inches and a length of 6 inches is 6.5 feet per second. The Reynolds number is 87,200. The reaction mixture is preheated in heater 20 to a temperature of 120° C., at which temperature and at a pressure of about 20 p.s.i.g. it enters reactor 21 maintained at a temperature of 120° C. and a pressure of 10 p.s.i.g. 5308 pounds of vapor are taken off overhead, consisting of 3077 pounds of phosgene, 941 pounds of solvent and 1290 pounds of HCl. The HCl is separated from this mixture by flow through the equipment shown in the drawing and recovered as hydrochloric acid solution in storage tank 43. The phosgene and solvent are recycled through the process.

16,600 pounds of reaction mixture are removed through line 45, consisting of 484 pounds of phosgene, 14,500 pounds of solvent, 22 pounds of HCl, and 1536 pounds of tolylene diisocyanate. The tolylene diisocyanate is separated by fractional distillation. The phosgene and solvent are returned to the process as shown in the drawing and hereinabove described.

The yield of tolylene diisocyanate is above 95% based on the amine.

EXAMPLE IV 20,340 pounds of a 35% phosgene solution in monochlorobenzene are pumped, at a pressure of 180 p.s.i.g., into reactor 14 maintained at a temperature of 80° C.; 8100 pounds of an amine solution consisting of 648 pounds of metaphenylene diamine and 7452 pounds of monochlorobenzene are pumped, at a pressure of 200 p.s.i.g., into mixer 15. The mol ratio of phosgene to amine is 12 to 1.

The rate of flow of the reaction mixture through the reactor having a nominal inside diameter of 1.5 inches and a length of 6 inches is 8.5 feet per second. The Reynolds number is 114,000. The reaction mixture is preheated in heater 20 to a temperature of 125° C., at which temperature and at a pressure of about 25 p.s.i.g., it enters recator 21 maintained at a temperature of 125° C. and a pressure of 15 p.s.i.g. 7565 pounds of vapor are taken off overhead, consisting of 5325 pounds of phosgene, 1406 pounds of solvent and 834 pounds of HCl. The HCl is separated from this mixture by flow through the equipment shown in the drawing and recovered as hydrochloric acid solution in storage tank 43. The phosgene and solvent are recycled through the process.

20,888 pounds of reaction mixture are removed through line 34, consisting of 609 pounds of phosgene, 19,266 pounds of solvent, 42 pounds of HCl, and 941 pounds of phenylene diisocyanate. The phenylene diisocyanate is separated by fractional distillation. The phosgene and solvent are returned to the process as shown in the drawing and hereinabove described.

The yield of phenylene diisocyanate is above 95% based on the amine.

Since certain changes can be made in the above described phosgenation procedure without departing from the scope of this invention, it is intended that all matter contained in the above description or shown in the accompanying drawing shall be interpreted as illustrated and not in a limiting sense.

What is claimed is:

1. A continuous method of preparing aromatic isocyanates by reacting in an inert organic solvent phosgene and an amine from the group consisting of aromatic primary mono-, di- and polyamines which process comprises:
    (a) continuously flowing a stream of phosgene in the liquid phase through a tubular reactor under superatmospheric pressure;
    (b) continuously introducing a stream of said amine in solution in said organic solvent into said stream of phosgene under a pressure at least equal to that in the tubular reactor to disperse the amine solution upon its introduction into the tubular reactor throughout the flowing stream of phosgene;
    (c) introducing said streams in amounts such that the resultant mixture contains at least 1 mol of phosgene and not exceeding about 12 mols of phosgene per mol of amine introduced into admixture with the phosgene and so as to effect forward flow in said tubular reactor of said amine solution, phosgene and the reaction products, thus minimizing back mixing thereof in said tubular reactor;
    (d) conducting the introduction of said solution and the flow of the resultant mixture through said tubular reactor so that the said flow takes place at a Reynolds number of at least 2,100, while maintaining the temperature of the resultant mixture in said tubular reactor at not exceeding about 90° C. to produce an intermediate reaction product containing aromatic isocyanate;
    (e) continuously introducing the intermediate reaction product produced in said tubular reactor into a second reaction zone maintained at a temperature of from 110° to 135° C. and maintaining the intermediate reaction product therein until the reaction has gone to substantial completion to form the desired isocyanate reaction product; and
    (f) continuously removing from said second reaction zone a liquid stream of reaction mixture consisting essentially of the organic solvent and the aromatic isocyanate reaction product and a vapor stream consisting essentially of unreacted phosgene, solvent and hydrochloric acid.

2. The continuous method defined in claim 1, in which the amine solution introduced into the tubular reactor contains from 2% to 25% of amine and the amine and phosgene streams are mixed in the ratio to provide from about 6 to 12 mols of phosgene per mol of amine.

3. The continuous method of claim 2, in which the amine solution is a solution of tolylene diamine in a monochlorobenzene solvent and the phosgene is introduced as a solution of phosgene in monochlorobenzene.

4. The continuous method of claim 1, in which the tubular reactor is maintained at a temperature of from 80° to 85° C. and the second reaction zone is maintained at a temperature of from 110° to 120° C.

5. The continuous method of claim 1, in which the amine is injected into the phosgene stream to produce finely divided particles which are uniformly dispersed throughout the flowing stream in said tubular reactor.

6. The continuous method of claim 1, in which the amine solution is a solution of phenylene diamine in monochlorobenzene and the phosgene is introduced as a solution in monochlorobenzene.

References Cited by the Examiner

UNITED STATES PATENTS

| | | | |
|---|---|---|---|
| 2,642,449 | 6/1953 | Morningstar et al. | 260—453 |
| 2,822,373 | 2/1958 | Beck | 260—453 |
| 2,908,703 | 10/1959 | Latourette et al. | 260—453 |

CHARLES B. PARKER, *Primary Examiner.*